May 13, 1930.  B. HEYMANN  1,758,041
LIGHT PROJECTOR
Filed May 23, 1928  3 Sheets-Sheet 1
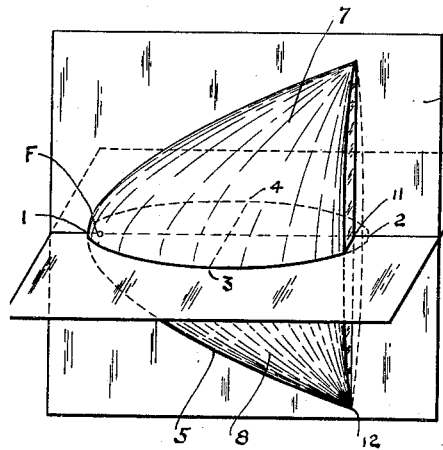
Fig.1
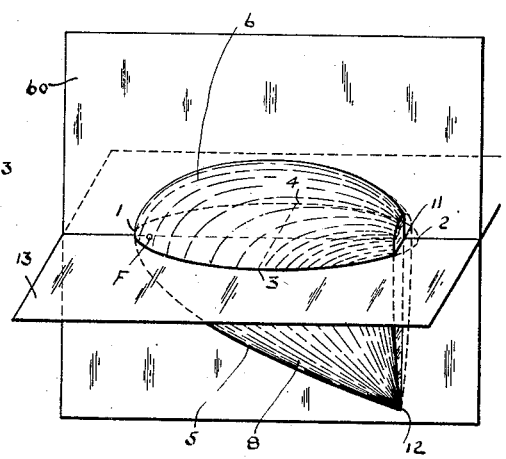
Fig. 2
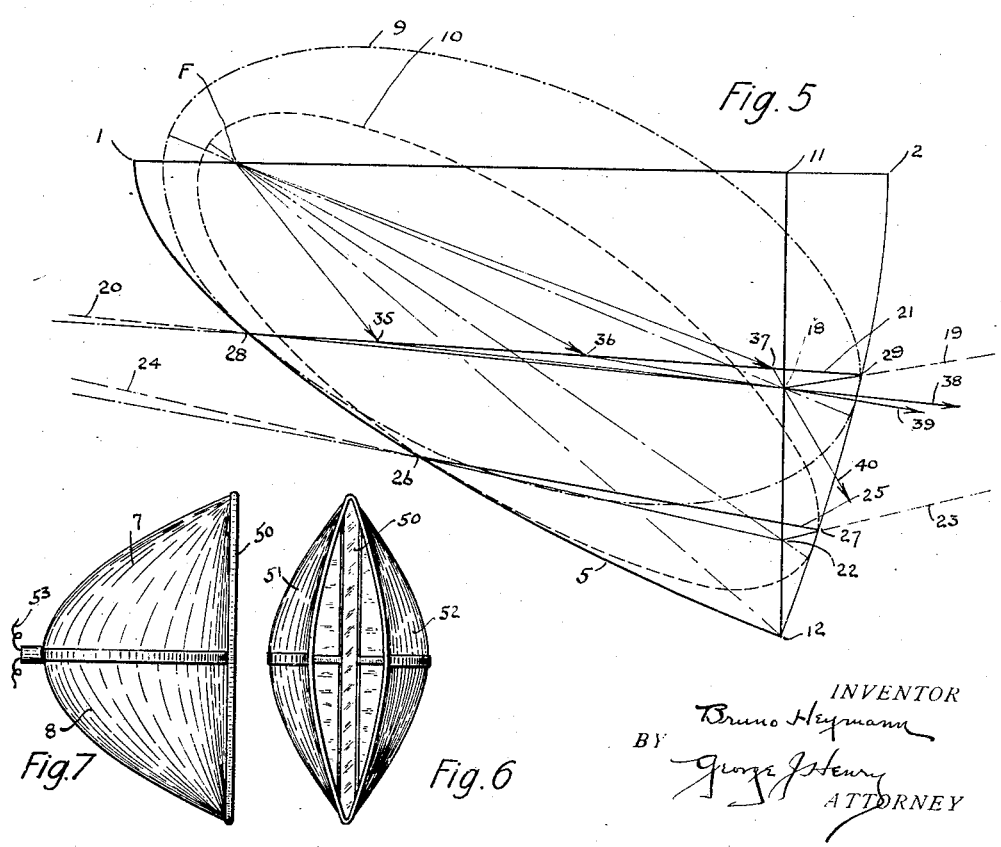
Fig. 5
Fig.7
Fig.6
INVENTOR
Bruno Heymann
BY
George J. Henry
ATTORNEY

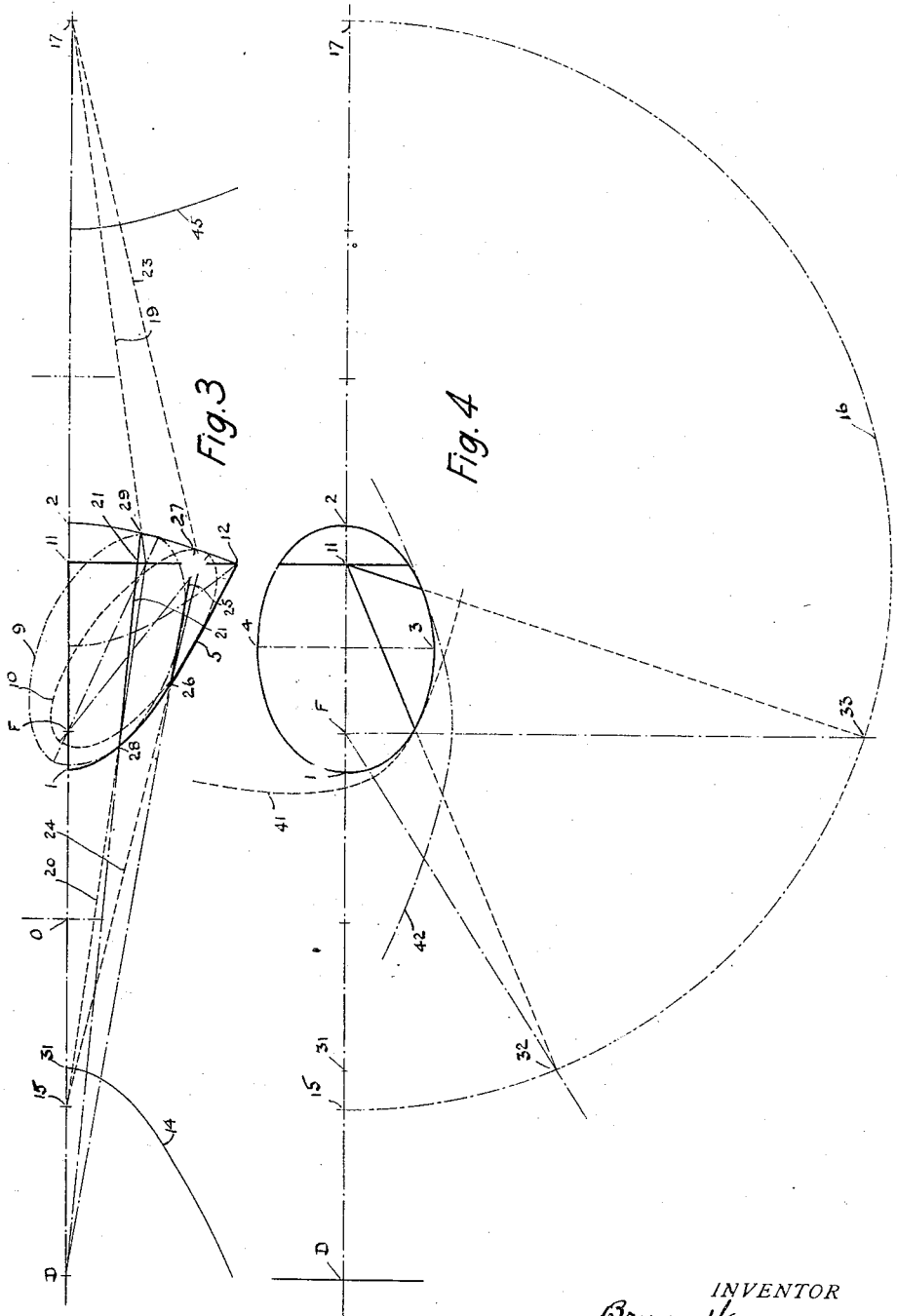

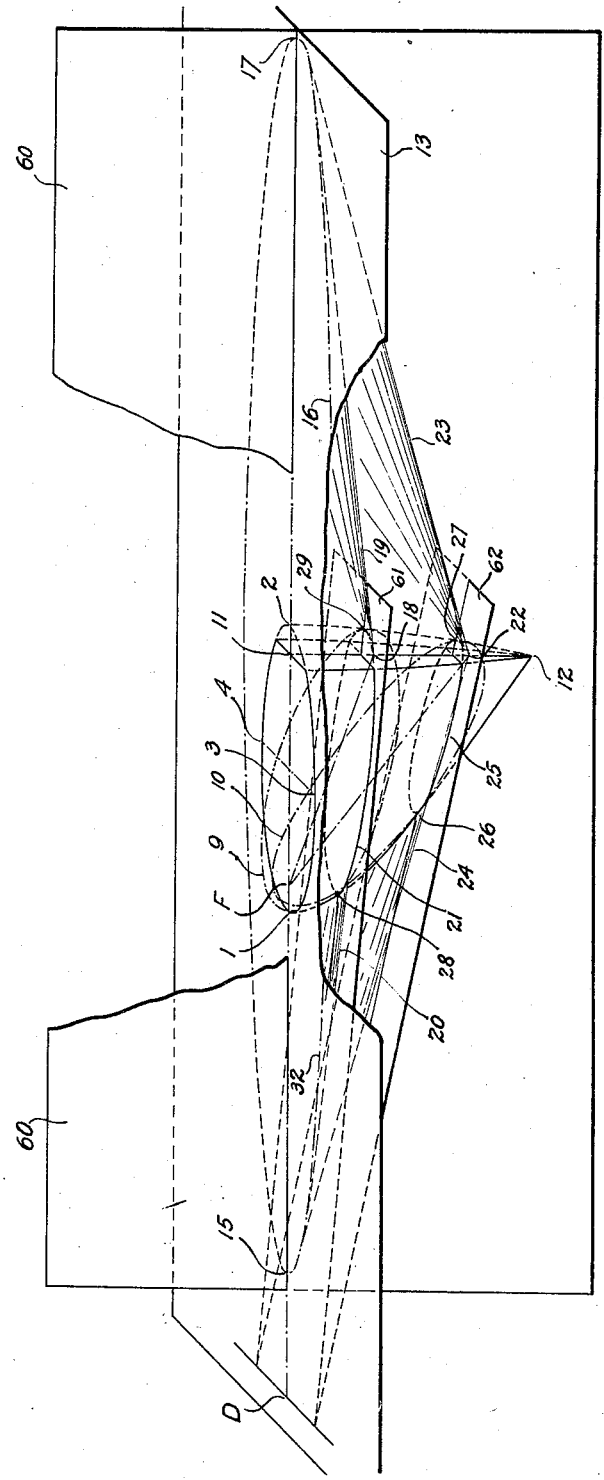

Patented May 13, 1930

1,758,041

UNITED STATES PATENT OFFICE

BRUNO HEYMANN, OF SAN FRANCISCO, CALIFORNIA

LIGHT PROJECTOR

Application filed May 23, 1928. Serial No. 279,962.

My invention has for its principal object a reflector adapted to project reflected light through a narrow front aperture and to disperse all of the reflected rays on a field in front thereof and below the horizontal plane through a light source.

Another object is a light projector wherein the reflected light emerges through a narrow slot and is dispersed in both directions over a field to be illuminated. In this form my projector is especially adapted to the use of air craft.

Another object is a light projector especially adapted to automobiles and wherein the reflected light emerges through a narrow slot and is dispersed entirely on one side of a plane through the light source.

A further object is a lamp of the character described wherein the reflecting surface is the locus of intersections of consecutive members of a family of confocal ellipsoids of revolution with consecutive members of a pencil of right circular cones.

Described in another way, the reflecting surface is the locus of intersections of consecutive members of a family of confocal hyperboloids of revolution and of consecutive elements of a vertical axial pencil of planes.

Other objects appear from the drawings and specification which follow:

In the drawings:

Figure 1 is a phantom view of a reflector surface particularly adapted to aeroplane use or to street lighting and embodying my invention.

Figure 2 is a phantom view of a reflector surface of an automobile head light embodying my invention.

Figure 3 is a diagram illustrating a mathematical method of generating the reflector surface of my invention.

Figure 4 is similar to Figure 3 but showing a different method of generating the same reflector surface, and is in a plane at right angles to the view of Figure 3.

Figure 5 is an enlarged view of a portion of Figure 3, to better illustrate the construction.

Figures 6 and 7 are front and side views respectively of a complete light projector embodying my invention, and embodying a reflector surface such as shown in Figure 1.

Fig. 8 represents in a larger scale, a perspective view of the mathematical diagram illustrated in Figs. 3 and 5 and showing the generation of my reflector surface.

Throughout the figures similar numerals refer to identical parts.

The reflecting surface illustrated in Figure 1 is symmetrical about the horizontal plane 13, and also about the vertical plane 60, through the light source. In the illustration in Figure 2 the reflector is symmetrical about the vertical plane 60, through the light source only. The trace of the reflector of both Figures 1 and 2 on the plane 13, is an ellipse indicated by the numerals 1, 2, 3, 4, and its dimensions once selected in addition to a selected eccentricity in the hyperbolic arc 5 fully determines all the dimensions of the reflecting surface.

The upper surface of Figure 2 is here illustrated as a hemi-ellipsoid 6, but any other conoid may be substituted in its place to suit the taste or requirements in particular cases.

The upper reflecting surface 7, of my invention conforms to the following definitions and is the gist of my invention:

1st. Said surface may be described as the locus of intersections of consecutive members of a family of confocal ellipsoids of revolution with consecutive elements of a pencil of right circular cones; or 2nd. It may be described as the locus of intersections of consecutive members of a family of confocal hyperboloids of revolution of two sheets, i. e., of revolution on the focal axis, with consecutive elements of a vertical axial pencil of planes; or 3rd. It may be described as the locus of points, the difference of whose distances from a fixed point (focus F) and another point (conjugate focus) which lies on a circle and is coordinated to said fixed point, is a constant. The said fixed point lies in the plane of said circle.

The first mathematical description is graphically illustrated in Figures 3, 5 and 8, and the second description is illustrated in Figure 4.

Referring particularly to Figures 3, 5 and 8, two traces selected from a family of ellipsoids of revolution are shown at 9, 10, all having a common focus F, which is to be the light source, and the conjugate foci of said ellipsoids lie on the straight line 11, 12, which is normal to the horizontal line F, 11, and to the plane 13. The lengths of the major axes of the said ellipsoids gradually increase from the minimum 1, 2 to the maximum F, 12. The minor axes of the said ellipsoids will gradually decrease from the maximum 3, 4, in the horizontal plane 13 (see Figure 1) to a minimum of zero for the last ellipsoid whose major axis is the line F, 12, the family of ellipsoids having now degenerated to a final straight line. The parameters of these ellipsoids will likewise decrease from a maximum for the ellipsoid in the horizontal plane 13, to a minimum for the ellipsoid whose major axis is the line F, 12.

To generate the surface of my reflector each of the ellipsoids aforesaid are to be intersected by the upper nappe of a corresponding cone and which cones collectively form a pencil of right circular cones whose apexes lie upon the conjugate focal line 11, 12. The intersection of the ellipsoids and lower nappes of the pencil of right circular cones, as indicated by the lines 70 and 71 respectively (Fig. 3), are discarded for the purpose of this surface.

The infinite number of such intersections of the family of ellipsoids with the lower nappes of the pencil of right circular cones are characteristics of another surface which reflects the light rays in an upward direction, while the surface described in this application reflects the rays in a downward direction. The family of right circular cones aforesaid have a circular base whose center is 11 and an arc of whose circumference is 15, 16, 17 (see Figures 4 and 8) and lying in the plane 13.

For each of the ellipsoids there will be a corresponding cone whose apex will be coincident with the conjugate focus of its ellipsoid, and each of the upper nappes of said cones will intersect its corresponding ellipsoid in an ellipse. Thus, for the ellipsoid 9, whose conjugate focus is at 18, there will be a cone whose apex is 18, and two of whose elements are 19, 20 respectively, and whose base will be a circle, an arc of which is shown at 15, 16, 17.

The line of intersection between the ellipsoid 9 and the said cone will then be an ellipse indicated by the line 21. Likewise for the ellipsoid 10, whose conjugate focus is at 22, there will be a cone having the same circular base whose arc is 15, 16, 17, and two of whose elements are shown at 23, 24 respectively, and which will intersect the ellipsoid 10 in an ellipse indicated by the line 25. The vertices of the ellipse 25 will be at 26, 27, and the vertices of the ellipse 21 will be at 28, 29. The locus of the proximate vertices of the family of ellipses formed as above described will be line 1, 28, 26, 12, and the locus of the remote vertices will be the line 2, 29, 27, 12.

It is the infinite number of ellipses as here described, including the master ellipse 1, 2, 3, 4, and diminishing through the ellipses 21, 25, and merging to the point 12, that form the reflecting surface.

There exist, therefore, an infinite number of pairs of ellipsoids and cones which are immutably linked together by the requirement that the apex of each cone must coincide with the conjugate focus of its associated ellipsoid. Each pair of these conoids intersect in an ellipse, and this ellipse is the only element common to both conoids and which is used for the synthesis of my reflecting surface. These ellipses diminish gradually from a maximum ellipse in the principal horizontal plane 13 to a point 12. The rate of diminishment follows a hyperbolic law. The loci of all vertices of these elliptic elements which build up the reflecting surface are hyperbolic arcs 1, 28, 26, 12 and 2, 29, 27, 12, and both pass through the lower end 12 of the line 11—12. All of these elliptic elements lie in planes which form a horizontal axial pencil about the axis D whose distance from the center O can readily be determined, and is displaced from 15. In Fig. 8 two planes 61 and 62 of said axial pencil are shown with elliptic elements 21 and 25 of my surface.

Another way of constructing my reflector surface is to employ an infinite number of hyperboloids of revolution whose major axis are of a constant length and lie in the plane 13. The axes of these hyperboloids is equal to the line 1, 31, but their parameters are variable. The said family being confocal at F, while the locus of their conjugate foci is the circle 15, 32, 33, 16, 17 in the horizontal plane 13 passing through the light source or focus F. This circle is identical with the base circle of the pencil of right cones described above. (See Fig. 4.)

The axes of revolution of all of these hyperboloids form a horizontal pencil through the common focus F and they intersect the circle 15, 16, 17 at the conjugate foci 15, 32, 33, 17. The traces, in plane 13, of each of the said corresponding hyperboloids of two sheets are shown in Fig. 4 as 5 and 14, 41 and 43, 42 and 44, 45 and 46.

If now we pass a vertical plane through each of the conjugate foci, as 32, 33, and the axis 11—12, each of said planes will intersect its corresponding hyperboloid in a hyperbolic arc. An infinite number of these hyperbolic arcs, one only being taken from each of the infinite number of hyperboloids above described, build up my reflecting surface. All of these arcs have but one point in common, i. e., the conic point 12.

The two branches of the generating hyperbola whose axis lies on the line D, 17, are shown respectively at 1, 28, 26, 12 and at 14. One of the legs of another generating hyperbola, whose foci are F and 32, is shown at 41, and one branch of a third generating hyperbola whose foci are F and 33, is shown at 42. In constructing a lamp in accordance with my invention the front portion of the conic construction is truncated, thus making an elongated but narrow vertical opening for the projected rays as shown at 50, while the two sides of the lamp bulge out as shown at 51, 52 (see Figure 6). It is to be understood that a suitable source of illumination, as an incandescent lamp, is to be positioned at the common focus F and energized as by service connections at 53.

The line 2, 29, 27, 12 is one leg of a generating hyperbola, the other leg of which is shown at 45, Figure 3, and whose foci are F and 17. The rate of diminishment of the ellipse 1, 2, 3, 4, in the plane 13, and other ellipses as 21 and 25, down to the final point into which they merge at 12 follows a hyperbolic law.

The surface which has now been constructed by either of the above methods may be visualized as a conic web composed of variable elliptic elements formed in planes penciling about a horizontal axis through the point D, and of variable hyperbolic elements in planes penciling about the vertical axis 11, 12.

In tracing the path of a pencil of rays emanating from the light source F and being reflected on my surface let it be assumed that the rays originating at F are reflected at 35, 36, 37 respectively, after impingement on the ellipse 21 they will then proceed in the shape of a circular cone having its apex at 18. This is true because 18 is the conjugate focus of the ellipsoid of revolution whose other focus was F, and it is this ellipsoid of revolution which has furnished the elements of the ellipse 21. These reflected rays, after passing through the focus 18, emerge from the projector in a downward diverging direction indicated respectively by the arrows 38, 39, 40, illuminating the entire foreground below the horizontal plane 13; that is downward and in front of the projector.

A light ray from the common focus F reflected on any of the hyperbolic elements which make up my reflector surface will follow a path drawn through the other focus and therefore follow a line drawn from the arc 15, 32, 33 and 16, and through the point of reflection. Such a path is however also one of the conical elements above described which proves the identity of the surfaces constructed by either of the two methods described above.

It will now be seen that my lamp collects and reflects the greatest amount of light from the source F, and distributes it most efficiently. In the case of the automobile headlight of Figure 2, this distribution will be entirely below the horizontal plane 13, whereas in the projector of Figure 1 the reflected light will be efficiently dispersed on both sides of said plane 13 and that in both types an aperture 50 of minimum width is employed while dispersion is attained over a wide area on each side and including the plane 60.

I claim:

1. In a light projector a concave reflecting surface which is the locus of intersections of a family of ellipsoids of revolution all of which have one common focus, whose major axes lie in the same plane and whose other foci lie on a straight line and a cone for each of said ellipsoids having its apex coincident with said other focus, all of said cones having a common base in a plane normal to said straight line and passing through said common focus and which intersections form a family of ellipses, said ellipses diminishing according to a hyperbolic law.

2. In a light projector a concave reflecting surface which is the locus of intersections of a family of ellipsoids of revolution all of which have one common focus, whose major axes lie in the same plane and whose other foci lie on a straight line and a cone for each of said ellipsoids having its apex coincident with said other focus, all of said cones having a common base in a plane normal to said straight line and passing through said common focus and which intersections form a family of ellipses, said ellipses diminishing according to a hyperbolic law.

3. A light projector having a reflecting surface which is the locus of the intersections of a family of hyperboloids of revolution having a common focus and whose other foci lie upon a circle in the plane of said common focus and struck from a point displaced from said common focus and a pencil of planes whose axis passes through said point and which axis is normal to the plane of said circle.

4. In a light projector, a reflecting surface which is the external envelope of a family of ellipsoids of revolution, all of which have one common focus, the plane of all major axes of said ellipsoids being perpendicular to a principal plane through the common focus; the locus of the conjugate foci of said family of ellipsoids being a straight line normal to said principal plane, said straight line being identical with the ordinate of the point of intersection of two opposed hyperbolic arcs having one common focus coincident with said first named common focus and said hyperbolic arcs being characteristics of said envelope.

5. In a light projector, a reflecting surface which is the locus of consecutive intersections of a family of ellipsoids of revolution with a pencil of right circular cones, said ellipsoids all having a common focus and whose conjugate foci lie upon a straight line, said pencil of cones having a common base passing through said common focus and the axis of said cones being identical with the locus of the said conjugate foci, each of said cones and its corresponding ellipsoid having coincident apices and conjugate foci respectively, will interest in an ellipse and the summation of all of said ellipses forming the said reflecting surface.

6. A light projector having a reflecting surface which is the locus of consecutive intersections of a family of hyperboloids of revolution, having one common focus and whose conjugate foci lie upon a circle in the plane of said common focus and struck from a point displaced forward from said common focus and a pencil of planes whose axis passes through said point and is normal to said plane.

BRUNO HEYMANN.